US010328377B2

(12) United States Patent
Ferreira

(10) Patent No.: US 10,328,377 B2
(45) Date of Patent: Jun. 25, 2019

(54) SEGMENTED BENDABLE FILTER

(71) Applicant: AirSept, Inc., Atlanta, GA (US)

(72) Inventor: Ivo Ferreira, Atlanta, GA (US)

(73) Assignee: AirSept, Inc., Atlanta, GA (US)

( * ) Notice: Subject to any disclaimer, the term of this patent is extended or adjusted under 35 U.S.C. 154(b) by 65 days.

(21) Appl. No.: 14/514,909

(22) Filed: Oct. 15, 2014

(65) Prior Publication Data

US 2015/0101296 A1     Apr. 16, 2015

Related U.S. Application Data

(60) Provisional application No. 61/890,917, filed on Oct. 15, 2013.

(51) Int. Cl.
| | | |
|---|---|---|
| *B01D 46/00* | (2006.01) | |
| *B01D 46/10* | (2006.01) | |
| *B01D 46/42* | (2006.01) | |
| *B01D 46/52* | (2006.01) | |

(52) U.S. Cl.
CPC ..... *B01D 46/4227* (2013.01); *B01D 46/0002* (2013.01); *B01D 46/0005* (2013.01); *B01D 46/10* (2013.01); *B01D 46/521* (2013.01); *B01D 2275/203* (2013.01); *Y10T 29/49826* (2015.01)

(58) Field of Classification Search
CPC ........ B01D 46/02; B01D 46/05; B01D 46/10; B01D 46/521; B01D 46/4227; B01D 46/0013; B01D 2271/02; B01D 2275/203
See application file for complete search history.

(56) References Cited

U.S. PATENT DOCUMENTS

| | | | | |
|---|---|---|---|---|
| 4,154,688 A | * | 5/1979 | Pall | B01D 29/21 210/487 |
| 5,679,122 A | * | 10/1997 | Moll | B01D 46/0005 210/493.3 |
| 5,931,988 A | * | 8/1999 | LeBlanc | B01D 46/001 55/341.1 |

(Continued)

FOREIGN PATENT DOCUMENTS

| | | |
|---|---|---|
| DE | 10 2007 016 161 A1 | 10/2008 |
| FR | 2 833 859 | 7/2002 |

(Continued)

OTHER PUBLICATIONS

English language machine translation for FR 2833859. Retrieved from https://worldwide.espacenet.com on Sep. 19, 2018. (Year: 2018).*

(Continued)

*Primary Examiner* — Jason M Greene
(74) *Attorney, Agent, or Firm* — Womble Bond Dickinson (US) LLP

(57) ABSTRACT

A filter includes a relatively rigid support frame having top and bottom frame members and side frame members. A filter element is disposed within and supported by the frame for filtering a medium passing through the filter element. Two opposing members of the frame are bendable into an arch to allow the filter to be progressively inserted along an arched path into a filter housing. In one embodiment, the filter is a cabin air filter for a vehicle and opposing sides of the frame are provided with V-shaped notches to facilitate bending the filter into an arch for insertion.

7 Claims, 3 Drawing Sheets

(56) References Cited

U.S. PATENT DOCUMENTS

| | | | |
|---|---|---|---|
| 6,164,457 A | 12/2000 | Schlor | |
| 6,568,540 B1 * | 5/2003 | Holzmann | B01D 29/016 210/445 |
| 6,860,916 B2 | 3/2005 | Kubokawa et al. | |
| 7,410,520 B2 * | 8/2008 | Nowak | B01D 46/0016 55/482 |
| 8,241,381 B2 * | 8/2012 | Braunecker | B01D 46/0013 55/483 |
| 2005/0044830 A1 * | 3/2005 | Dworatzek | B01D 46/009 55/502 |
| 2009/0320426 A1 * | 12/2009 | Braunecker | B01D 46/0013 55/511 |
| 2010/0043366 A1 | 2/2010 | Boehrs et al. | |
| 2010/0051530 A1 * | 3/2010 | Manz | B01D 46/0002 210/232 |
| 2010/0147381 A1 | 6/2010 | Haney et al. | |
| 2013/0305930 A1 * | 11/2013 | Oh | B01D 46/0002 96/385 |

FOREIGN PATENT DOCUMENTS

| | | | | |
|---|---|---|---|---|
| FR | 2833859 | * | 6/2003 | B01D 46/0005 |
| JP | 1-101614 | | 7/1989 | |

OTHER PUBLICATIONS

International Preliminary Report on Patentability and Written Opinion in International Application No. PCT/US2014/060702 dated Apr. 28, 2016.
Written Opinion and Search Report dated Dec. 22, 2014 in PCT/US2014/060702.

* cited by examiner

SEGMENTED BENDABLE FILTER

REFERENCE TO RELATED APPLICATION

Priority is hereby claimed to the filing date of U. S. provisional patent application 61/890,917 entitled Segmented Bendable Filter, which was filed on Oct. 15, 2013.

TECHNICAL FIELD

This disclosure relates generally to filters and, in a preferred embodiment, to a cabin air filter for a vehicle such as a truck or automobile.

BACKGROUND

Many trucks and automobiles have ventilation systems that includes a cabin air filter that filters air before it is expelled into the passenger compartment. Cabin air filters should be changed regularly to insure that occupants of the vehicle are provided with fresh filtered air when using the air conditioning, vent, or heater. In some vehicles, changing the cabin air filter is straight forward and simply requires the removal of a cover plate, removal of the old filter, and insertion of a fresh filter. In these vehicles, there is ample space between the vent and filter housings and the floorboard or other interior structures to allow access and replacement. However, in some vehicles and in particular in the cabs of trucks such as pickup trucks, the filter housing can be located in the cabin beneath the dash directly above the rather large hump in the floor that accommodates the transmission. Further, the filter housing that contains the cabin filter in these situations is accessible only from below through a removable filter access port. Since the cabin air filter itself is significantly longer than the space between the filter access port and the transmission hump, it can be difficult to remove the old filter and even more difficult to install a new filter without damaging or destroying the filter itself. This is because the air filter must be bent, twisted, and otherwise contorted to slide it up into the filter housing and this can cause glue joints and frame elements supporting the filter element to break or otherwise fail.

There is a need for a filter and particularly a cabin air filter for vehicles that can be installed easily in a filter housing located in tight and cramped quarters without damaging or destroying the filter. It is to the provision of such a filter that the present invention is primarily directed.

SUMMARY

Briefly described, a cabin air filter for a vehicle has a support frame that supports a filter element such as a pleated fibrous filter element. The sides of the frame are provided with V-shaped notches that define frame segments to which opposing sides of the filter element are glued or otherwise attached. Due to the notches, which are aligned from side-to-side of the filter, the filter can be bent easily into an arch without damaging the filter, its frame, or the filter element. To install the filter, an access panel is removed from the air filter housing and the old filter is removed through the access port. A filter according to the present invention can then be bent into an arch and progressively slid along an arched path through the access port into the filter housing. As the filter moves into the filter housing, it progressively flattens back to a planar shape until it is completely inserted into the filter housing. The filter can thus be slid easily through an access port that is located in tight or cramped quarters, which is common in certain vehicles such as truck cabs. The access panel is then reinstalled and the new filter fulfills its role to filter cabin air. These and other aspects, features, and advantages of the invention disclosed herein will become apparent to the skilled artisan upon review of the detailed description set forth below taken in conjunction with the accompanying drawing figures, which are briefly described as follows.

DETAILED DESCRIPTION

The entire content of the provisional patent application to which priority is claimed above is hereby incorporated by reference.

Figure 1:
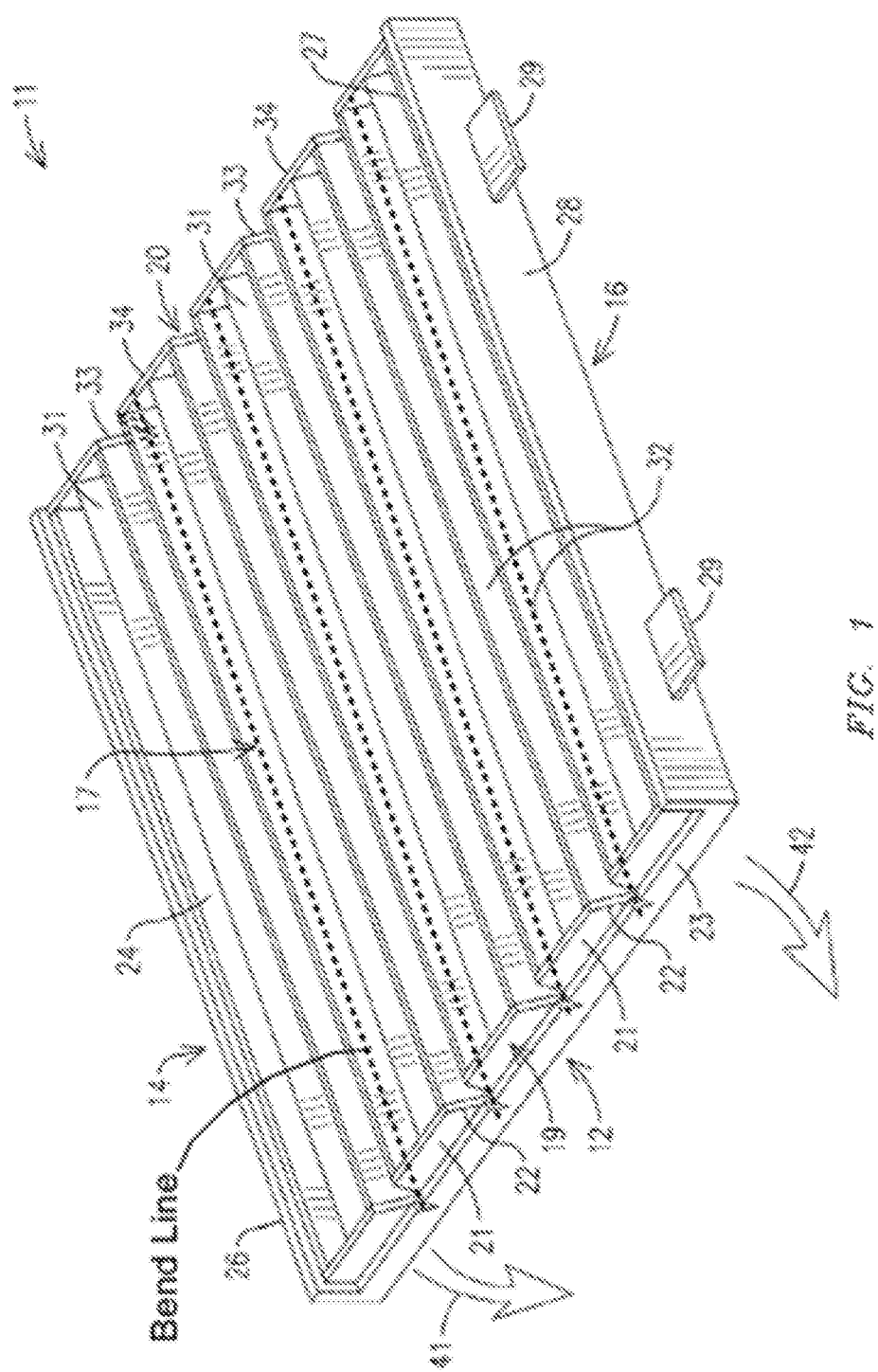
FIG. 1 is a perspective view of a segmented bendable filter that embodies principles of the invention in one preferred form.

Referring now in more detail to the drawing figures, wherein like reference numerals indicate like parts throughout the several views, FIG. 1 shows a filter that embodies principles of the invention in one preferred form. The filter shown in FIG. 1 is specifically configured as a cabin air filter for a vehicle and particularly a pickup truck, and the invention will be described in this context. It will be appreciated, however, that the invention is not limited to a cabin air filter or a vehicle filter at all, but rather is applicable to any filter that must be installed through an access port that is located in tight or cramped quarters making access difficult. Consequently, the invention may apply to home HVAC filters, industrial air filters, or even to fluid filters that are difficult to access and replace.

Referring again to FIG. 1, a filter 11 has a left side 12, a right side 13, a top side 14 and a bottom side 16. The left, right, top, and bottom sides form a support frame within which a pleated air permeable filter element 17 is disposed. The filter element is secured with adhesive or sealant to the frame to prevent air leaks between the filter element and the frame. The top side 14 of the frame includes an elongated relatively rigid support 24 spanning the width of the filter 11. Similarly, the bottom side 16 of the frame includes an elongated relatively rigid support 27 that also spans the width of the filter 11. In the preferred embodiment, a rubberized gasket 26 is attached along the outside of the top side support 24 and a rubberized gasket 28 is attached along the outside of the bottom side support 27. These gaskets seal against walls of a filter housing when the filter is installed to minimize air leaks around the outside of the frame. Pull tabs 29 extend from the bottom side 16 to provide a structure that can be grasped to pull the filter from its housing when it is spent and needs replacement with a fresh filter.

The left side 12 of the support frame is made of a relatively rigid strip of material 19 and is formed with a series of V-shaped notches 22 that extend from the back side of the strip 19 toward the front side. The V-shaped notches 22 define a plurality of tabs 21 in the strip 19. A rubberized gasket strip 23 is adhered along the outside of the strip of material 19 for engaging and sealing against a wall of a filter housing to reduce air leaks. The V-shaped notches in the illustrated embodiment extend into the gasket, but this is not a requirement and the notches may stop short of or not be cut into the gasket itself if desired. The gasket, which preferably is made of a stretchy material such a rubber or foam, helps to insure that the filter reconfigures itself into a planar shape after having been bent and inserted into a filter housing as detailed below. The right side 13 of the frame is a mirror image of the left side 12 and includes a relatively rigid strip 20 of material formed with notches 33 that define segments 34. While not visible, the right side 13 also includes an exterior rubberized gasket to seal against a wall of a filter housing within which the filter 11 is installed and to help re-flatten the filter once it is inserted into the filter housing.

A pleated filter element 17 is mounted within the support frame 19 and is made of a woven or non-woven or other filter material that passes air but traps suspended dust, pollen, and other particles that may be entrained within the air. Such materials are known in the art. The material of the filter element is accordion folded to form a plurality of pleats 31 that extend from the left side support frame to the right side support frame. The side edges of the pleated filter element are secured to the sides of the support frame with an appropriate sealant or adhesive. Further, one of the pleats of the filter element is aligned with each one of the V-shaped notches in the sides 12 and 13 of the support frame. In this way, the filter element does not inhibit the spreading apart of the V-shaped notches when the filter is bent into an arch during installation. A relatively rigid support strip 32 preferably is adhered to one side of each aligned pleat to provide side-to-side support to the filter element when the filter is bent into an arch. Finally, the top and bottom pleats of the filter element are secured with adhesive to the top and bottom supports 24 and 27 of the frame with an appropriate adhesive.

Figure 2:
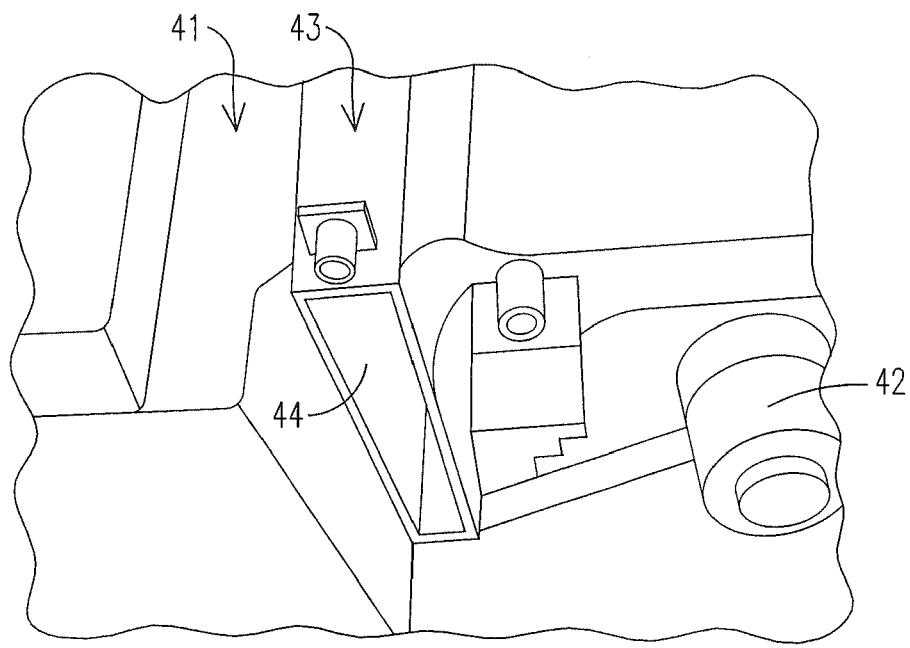
FIG. 2 illustrates a typical cabin air filter housing showing the outer cover and access panel removed to reveal the filter access port of the housing.
Figure 3:
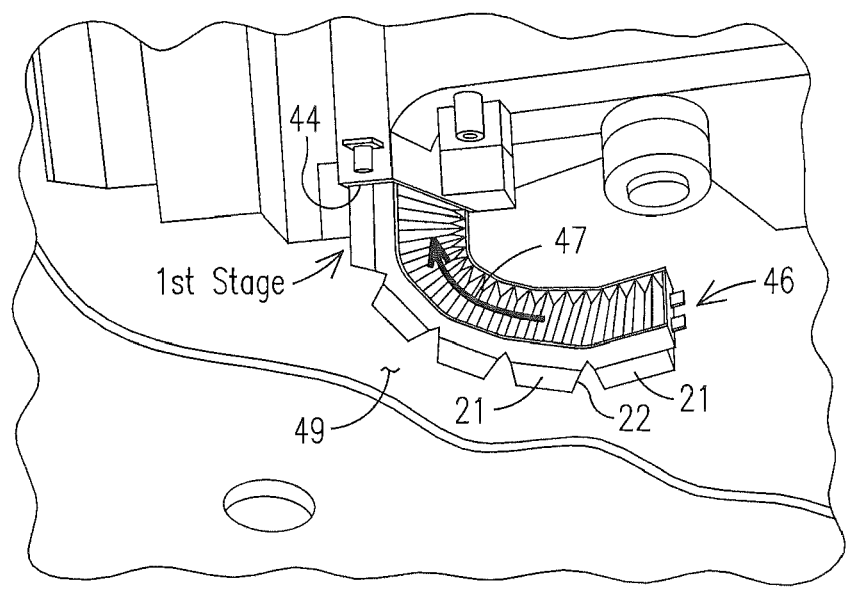
FIG. 3 illustrates the filter of the present invention bent into an arch and just being inserted through the access port of a filter housing.
Figure 4:
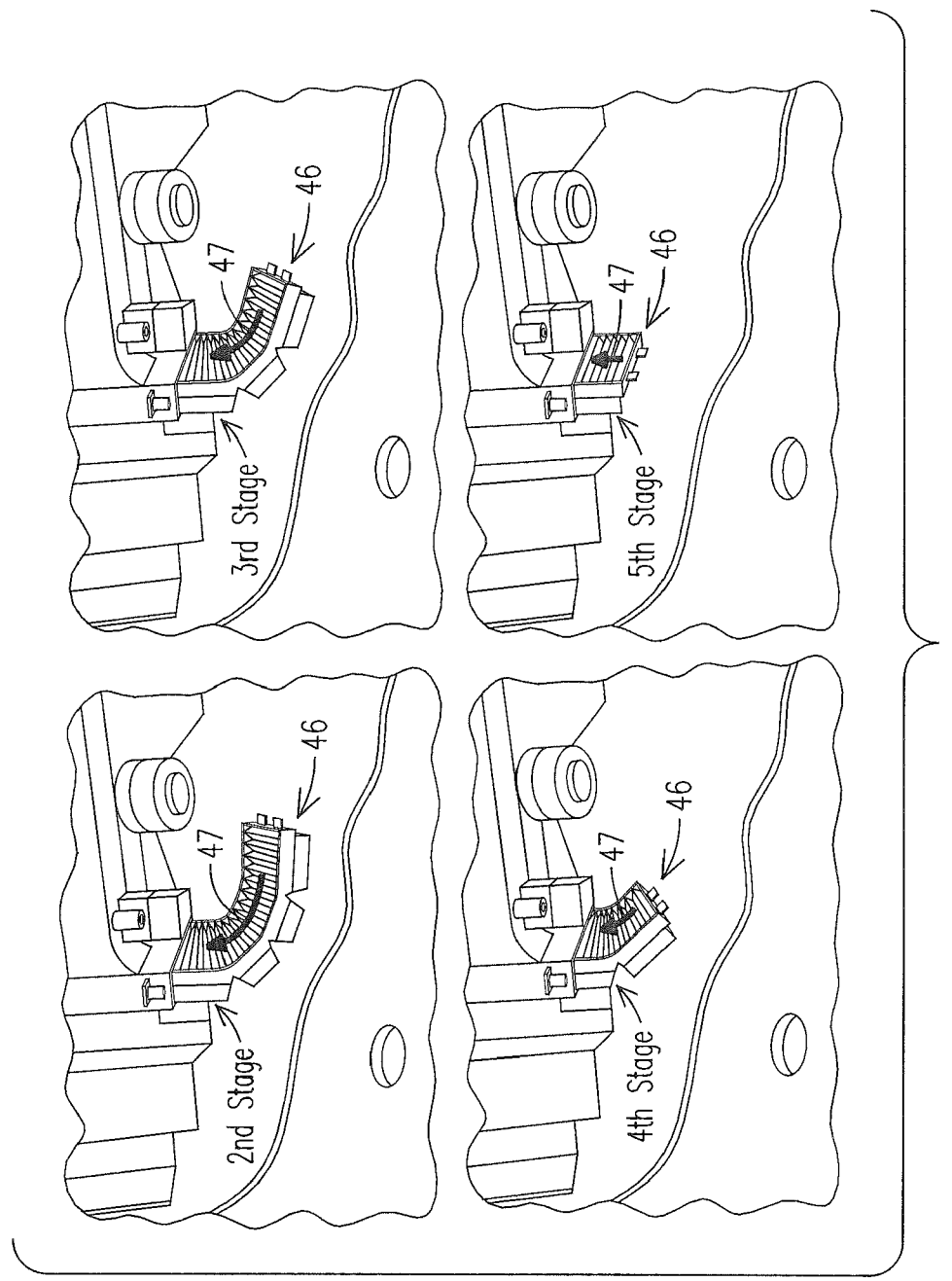
FIG. 4 shows sequentially the progressive insertion of the filter along an arched path into the filter housing to accommodate the cramped space between the access port of the filter housing and the transmission hump below.

FIGS. 2-4 illustrate the installation of a filter according to this invention into the ductwork of a vehicle's HVAC system. In this event, the HVAC system is of a Chevrolet® Silverado® pickup truck, which is notorious for providing a small confined space within which to access and change the cabin air filter. FIG. 2 shows the HVAC ductwork 41 within the passenger compartment beneath the dash after the outer cover or kick plate has been removed. The ductwork 41 defines a filter housing 43 within which a cabin air filter resides. Rectangular access port 44 provides access to the filter housing for removing and replacing the cabin air filter. While not visible in FIG. 2, the transmission hump in the referenced vehicle is disposed just beneath the access port 44 a distance significantly less than the height of a cabin air filter to be inserted through the access port 44. This confined space makes it difficult to remove and replace traditional rigid cabin air filters.

FIG. 3 shows the first stage of insertion of a cabin air filter of the present invention into the filter housing shown in FIG. 2. Here, the transmission hump 49 is visible just below the access port 44 and it can be seen that the height of the filter 46 is significantly greater than the distance from the access port to the transmission hump. In FIG. 3, the filter 46 has been bent into an arch as described with its tabs 21 splayed apart and its V-shaped grooves spread to accommodate the bending. The top end of the arched filter is being urged through the access port 44 and into the filter housing in the direction of arrow 47.

In the upper left image of FIG. 4, the filter 46 has been inserted a bit further through the access port and in the upper right image a bit further still. The lower left image shows all but the last two segments of the filter 46 inside the filter housing and the lower right image of FIG. 4 shows the final step of the last segment of the filter moving through the access port into the housing. As the arched filter moves through the access port and into the housing, it naturally straightens out to conform to the flat planar shape of the housing and is aided in this regard by the rubberized side gaskets and the filter stops within the gasket housing. When the gasket is fully inserted into the gasket housing, it takes on the flat configuration shown in FIG. 1 and functions as a normal cabin air filter to filter air drawn into or circulated within the passenger cabin of the vehicle.

When it is time to remove the cabin air filter of this invention, the process is simply reversed. The access port is opened and the filter is grasped by its tabs 29 (FIG. 1) and pulled out through the access port of the filter housing. During removal, the filter may again bend into an arch to allow it to be removed cleanly, smoothly, and easily. This can be important since used filters generally are covered with dust and pollen that could be released into the vehicle's passenger compartment if the filter were removed in a jerky torturous manner, as is common with traditional rigid cabin air filters.

The invention has been described herein in terms of a preferred embodiment and a preferred methodology considered by the inventor to represent the best mode of carrying out the invention. It will be understood by those of skill in the art, however, that the invention is not limited by the preferred embodiment or the context within which it is described. In fact, the inventive filter of this disclosure can be used in virtually any scenario where a filter is to be removed and replaced in tight, confined, or otherwise cramped spaces. Thus, the invention can be applied to home air conditioning and heating filters, office HVAC filters, and even oil and hydraulic fluid filters. These and other additions, deletions, and modifications may well be made to the preferred embodiments illustrated herein without departing from the spirit and scope of the invention, which is delimited only by the claims.

What is claimed is:

1. A filter configured to be slid into a filter housing, the filter comprising:

a relatively rigid open rectangular support frame having a top side member, a bottom side member opposite the top side member, a left side member, and a right side member opposite the left side member, each of the top, bottom, left, and right side members being substantially rigid and having an outer edge and an inner edge;

the left and right side members each having at least one notch formed at a preselected location along its length with the notch extending from the outer edge of the side member part way to the inner edge of the side member, the notches being aligned with each other and defining at least a first substantially rigid frame segment on one side of a bend line joining the notches and a second substantially rigid frame segment on the other side of the bend line;

the first and second frame segments being bendable relative to each other along the bend line;

a filter element disposed within, spanning, and supported by the open frame for filtering a medium passing therethrough;

the filter element comprising at least a first plurality of pleats and a second plurality of pleats, the first plurality of pleats being disposed within and supported by the first substantially rigid frame segment with its pleats extending from the left side member to the right side member, and the second plurality of pleats being disposed within and supported by the second substantially rigid frame segment with its pleats extending from the left side member to the right side member;

the filter element being bendable along the bend line along with the substantially rigid first and second frame segments to accommodate insertion of the filter into a filter housing;

the left and right side members are of a material and shape that resists bending except at the locations of the notches:

gaskets secured along the side members to seal between the filter and a filter housing within which the filter is inserted; and the notches extending into the gaskets.

2. The filter of claim 1 wherein the medium comprises air.

3. The filter of claim 1 wherein the at least one notch comprises a plurality of V-shaped notches defining three or more frame segments and the filter element comprises a plurality of pleats, each of the plurality of pleats being disposed within and supported by a respective frame segment.

4. The filter of claim 1 wherein the gaskets are made of a stretchable material that helps re-flatten the filter after it has been bent along the bend line.

5. The filter of claim 4 wherein the stretchable material comprises a rubberized material.

6. The filter of claim 4 wherein the stretchable material comprises a foam material.

7. The filter of claim 1 further comprising gaskets secured along the top and bottom side members to seal between the filter and a filter housing within which the filter is inserted.

* * * * *